United States Patent
Shivalinga et al.

(10) Patent No.: US 11,554,915 B2
(45) Date of Patent: Jan. 17, 2023

(54) CARGO AISLE DRIVE SYSTEM

(71) Applicant: Goodrich Corporation, Charlotte, NC (US)

(72) Inventors: Vinodkumar Shivalinga, Bangalore (IN); Sanjay Rao Srinivasa, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/134,852

(22) Filed: Dec. 28, 2020

(65) Prior Publication Data
US 2021/0269241 A1    Sep. 2, 2021

(30) Foreign Application Priority Data
Mar. 2, 2020   (IN) .............................. 202041008904

(51) Int. Cl.
*B65G 1/04*     (2006.01)
*B64D 9/00*     (2006.01)

(52) U.S. Cl.
CPC ............. *B65G 1/0492* (2013.01); *B64D 9/00* (2013.01); *B65G 2203/042* (2013.01)

(58) Field of Classification Search
CPC .................................................. B65G 1/0492
See application file for complete search history.

(56) References Cited

U.S. PATENT DOCUMENTS

| | | | |
|---|---|---|---|
| 9,284,130 B1 * | 3/2016 | Himmelmann | B64C 1/20 |
| 2018/0162478 A1 | 6/2018 | Silverwood | |
| 2018/0245371 A1 * | 8/2018 | Hernandez | B64D 29/06 |
| 2018/0362160 A1 | 12/2018 | Groninga et al. | |
| 2020/0377298 A1 * | 12/2020 | An | G05D 1/0255 |

FOREIGN PATENT DOCUMENTS

| | | |
|---|---|---|
| CN | 104941170 | 3/2017 |
| KR | 2004111400 | 12/2004 |

* cited by examiner

*Primary Examiner* — Saul Rodriguez
*Assistant Examiner* — Willie Berry, Jr.
(74) *Attorney, Agent, or Firm* — Snell & Wilmer L.L.P.

(57) ABSTRACT

A cargo aisle drive system is disclosed. In various embodiments, the system includes a drive track; and a drive car configured for motorized translation along a length of the drive track, the drive car including a first plate, a second plate having an upper surface and a lower surface, the first plate pivotally disposed on the upper surface of the second plate, a drive assembly connected to the lower surface of the second plate, and a first strain gauge sensor configured to detect a pivotal movement between the first plate and the second plate of the drive car.

19 Claims, 14 Drawing Sheets

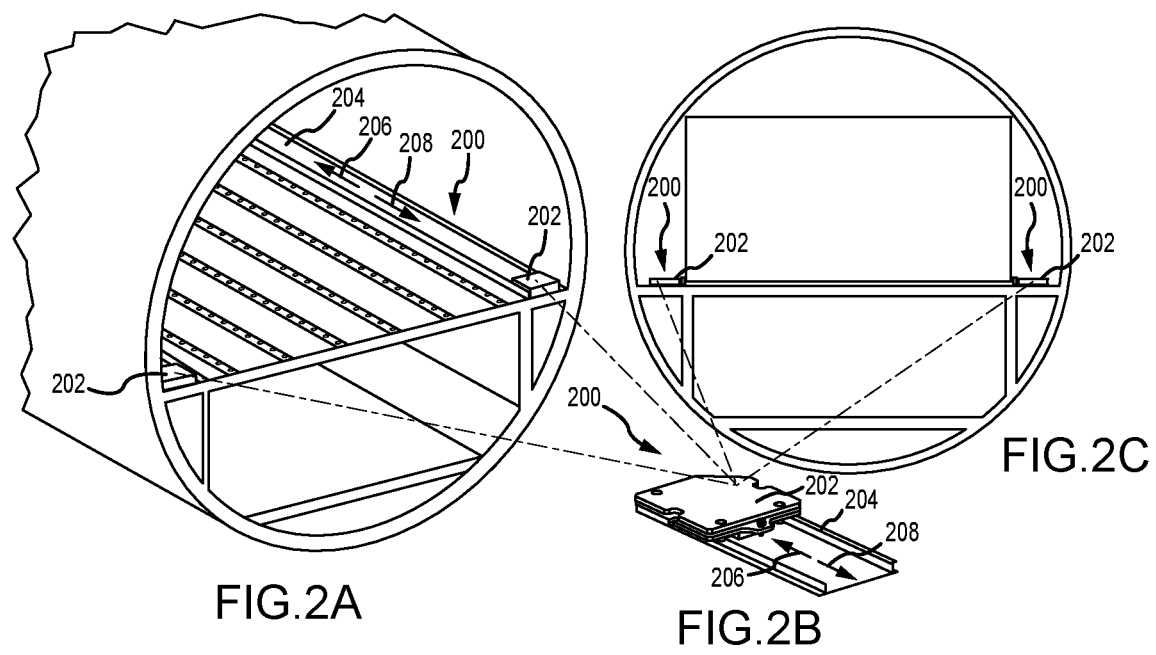

CARGO AISLE DRIVE SYSTEM

CROSS-REFERENCE TO RELATED APPLICATIONS

This application claims priority to, and the benefit of, Indian Patent Application No. 202041008904, filed Mar. 2, 2020 and titled "CARGO AISLE DRIVE SYSTEM," which is incorporated by reference herein in its entirety for all purposes.

FIELD

The present disclosure relates generally to freighter aircraft and, more particularly, to methods, apparatus and systems used to transit an operator along an aisle of a cargo compartment within a freighter aircraft.

BACKGROUND

Typical freighter aircraft include a cargo compartment that extends along an entire main deck of the aircraft and whose length often varies from one-hundred thirty feet (≈40 meters) to one-hundred sixty five feet (≈50 meters). Under a typical loading or unloading scenario, an operator may traverse the entire length of the cargo compartment several times to perform various activities associated with the loading and the unloading of the cargo compartment. Several such activities may include monitoring or controlling each unit load device (ULD) as it is being loaded or unloaded, restraining each ULD following its being loaded, un-restraining each ULD prior to its being unloaded, performing inspection checks prior to takeoff and during flight, and performing repairs to or replacement of various line replaceable units (LRUs) as required or pursuant to maintenance schedules. These activities may be time consuming and result in physical or mental exhaustion for the operator, leading to reduced efficiency and increasing the potential for operator error.

SUMMARY

A cargo aisle drive system is disclosed. In various embodiments, the system includes a drive track; and a drive car configured for motorized translation along a length of the drive track, the drive car including a first plate, a second plate having an upper surface and a lower surface, the first plate pivotally disposed on the upper surface of the second plate, a drive assembly connected to the lower surface of the second plate, and a first strain gauge sensor configured to detect a pivotal movement between the first plate and the second plate of the drive car.

In various embodiments, the first strain gauge sensor is disposed proximate a first end of the drive car. In various embodiments, the first strain gauge sensor includes an actuator rod slidably disposed with respect to the second plate. In various embodiments, the system includes a second strain gauge sensor, with the first strain gauge sensor being disposed proximate a first end of the drive car and the second strain gauge sensor being disposed proximate a second end of the drive car. In various embodiments, at least one of the first strain gauge sensor and the second strain gauge sensor includes an actuator rod configured to transfer a tensile load or a compressive load to a strain gauge. In various embodiments, the strain gauge is electrically coupled to the drive assembly and the drive assembly is configured to propel the drive car in a first direction or a second direction based on a signal received from the strain gauge representing the pivotal movement between the first plate and the second plate of the drive car.

In various embodiments, the drive assembly includes a drive wheel in contact with the drive track and configured to propel the drive car along the length of the drive track in a first direction and a second direction. In various embodiments, a horizontal guide roller assembly is connected to the lower surface of the second plate and configured to roll over the drive track. In various embodiments, a first vertical guide roller assembly is connected to the lower surface of the second plate and configured to roll against a first vertical flange connected to the drive track. In various embodiments, a second vertical guide roller assembly is connected to the lower surface of the second plate and configured to roll against a second vertical flange connected to the drive track.

In various embodiments, the drive car includes a first battery configured for charging via a first battery charging system disposed at a first end of the drive track. In various embodiments, the drive car includes a second battery configured for charging via a second battery charging system disposed at a second end of the drive track. In various embodiments, the drive car includes a docking plunger assembly configured for releasable connection to the first battery charging system.

A drive car configured to propel an operator along a drive track of a cargo aisle drive system is disclosed. In various embodiments, the drive car includes a first plate; a second plate having an upper surface and a lower surface, the first plate pivotally disposed on the upper surface of the second plate; a drive assembly connected to the lower surface of the second plate, and a first strain gauge sensor configured to detect a pivotal movement between the first plate and the second plate of the drive car. In various embodiments, the drive car includes a second strain gauge sensor, with the first strain gauge sensor being disposed proximate a first end of the drive car and the second strain gauge sensor being disposed proximate a second end of the drive car.

In various embodiments, the drive assembly includes a drive wheel configured for contact with the drive track and to propel the drive car along a length of the drive track in a first direction and a second direction. In various embodiments, a horizontal guide roller assembly is connected to the lower surface of the second plate and configured to roll over the drive track. In various embodiments, a first vertical guide roller assembly is connected to the lower surface of the second plate and configured to roll against a first vertical flange connected to the drive track and a second vertical guide roller assembly is connected to the lower surface of the second plate and configured to roll against a second vertical flange connected to the drive track.

In various embodiments, a first battery is configured for charging via a first battery charging system disposed at a first end of the drive track. In various embodiments, a second battery is configured for charging via a second battery charging system disposed at a second end of the drive track.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

FIGS. 2A, 2B and 2C illustrate various views of a cargo aisle drive system, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
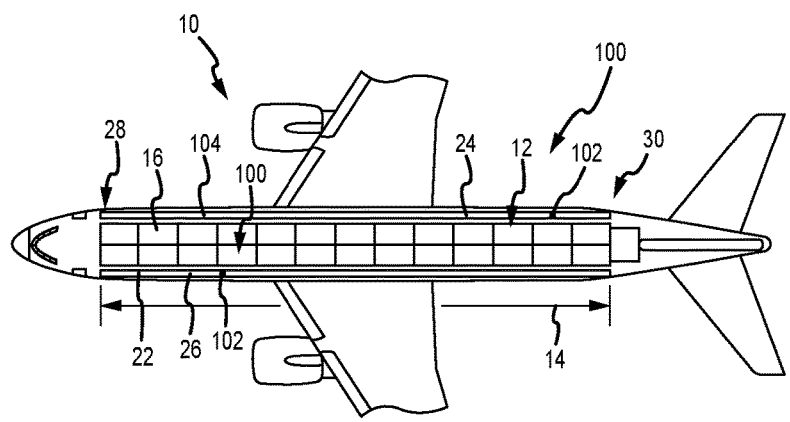
FIGS. 1A and 1B illustrate overhead and cross-sectional views of a cargo compartment of a freighter aircraft, in accordance with various embodiments.
Figure 1B:
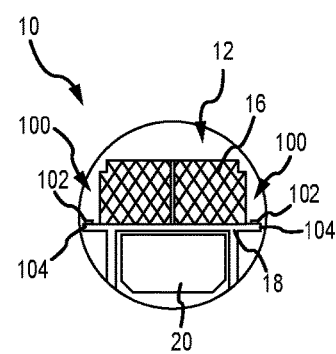

Referring now to the drawings, FIGS. 1A and 1B illustrate an overhead view (FIG. 1A) and a cross-sectional view (FIG. 1B) of a freighter aircraft 10 having a cargo compartment 12, in accordance with various embodiments. As illustrated, the cargo compartment defines a cargo compartment length 14 along which a unit load device (ULD) 16, or a plurality of ULDs, is stored and restrained on a main deck 18 during operation of the freighter aircraft 10; a second plurality of ULDs 20 may also be stored and restrained underneath the main deck 18. In various embodiments, an aisle 22 extends along the cargo compartment length 14. In various embodiments, the aisle 22 may be considered either or both of a starboard side aisle 24 and a port side aisle 26. As will be described in further detail below, in various embodiments, a cargo aisle drive system 100, which includes a drive car 102 disposed on a drive track 104 on either or both of the starboard side aisle 24 and the port side aisle 26 and configured to transit an operator back and forth between a fore end 28 of the cargo compartment 12 and an aft end 30 of the cargo compartment 12. Referring briefly to FIGS. 2A, 2B and 2C, various views of a cargo aisle drive system 200 are illustrated. The cargo aisle drive system 200, similar to the cargo aisle drive system 100 just described with reference to FIGS. 1A and 1B, includes a drive car 202 disposed on a drive track 204, where the drive car 202 is configured for motorized translation in both a fore direction 206 (or a first direction) and an aft direction 208 (or a second direction) along a length of the drive track 204.

Referring now to FIGS. 3A, 3B, 3C, 3D and 3E, various assembled and exploded views of a cargo aisle drive system 300 are illustrated, in accordance with various embodiments. As described above, the cargo aisle drive system 300 includes a drive car 302 disposed on a drive track 304 (see FIG. 3D). In various embodiments, the drive car 302 includes a first plate 310 (or an upper plate) and a second plate 312 (or a lower plate), where the first plate 310 is pivotally mounted onto the second plate 312 via a ridge 314 that extends along an underside of the first plate 310 (see FIG. 3D) from a first side 316 of the first plate 310 to a second side 318 of the first plate 310. A drive assembly 320 is configured for attachment to an underside of the second plate 312 and configured to propel the drive car 302 along the drive track 304. Without loss of generality, in various embodiments, the second plate 312 has an upper surface and a lower surface, the first plate 310 is pivotally disposed on the upper surface of the second plate 312 and the drive assembly 320 is connected to the lower surface of the second plate 312.

Figure 3A:
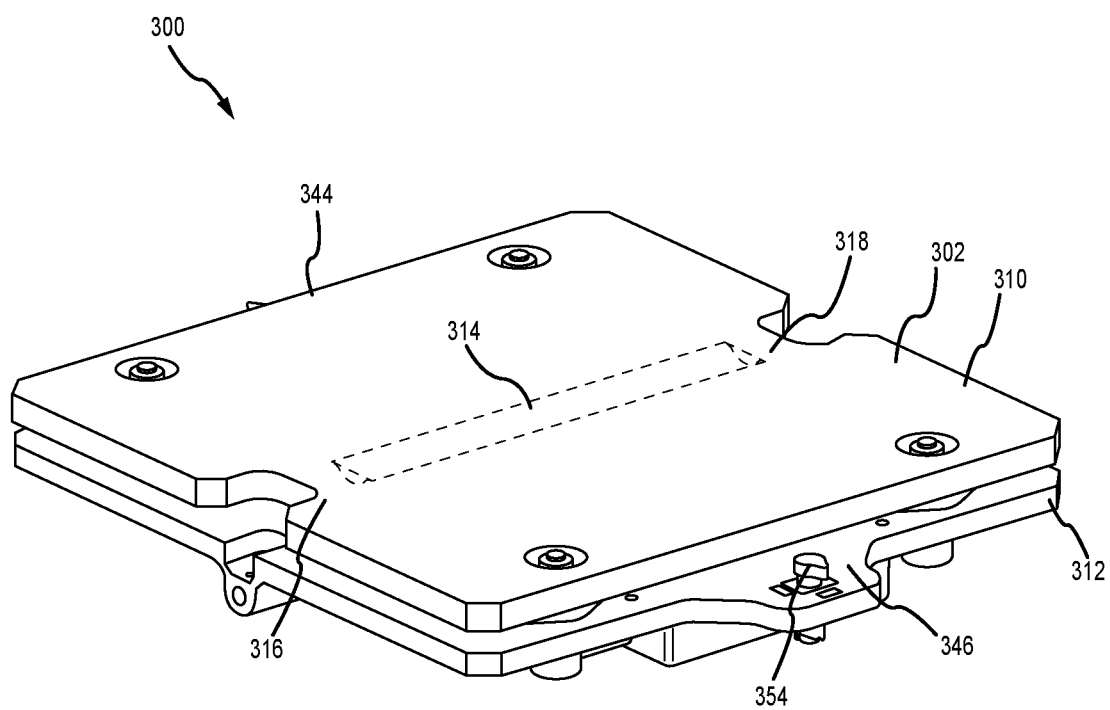
FIGS. 3A, 3B, 3C, 3D and 3E illustrate various assembled and exploded views of a cargo aisle drive system, in accordance with various embodiments.
Figure 3B:
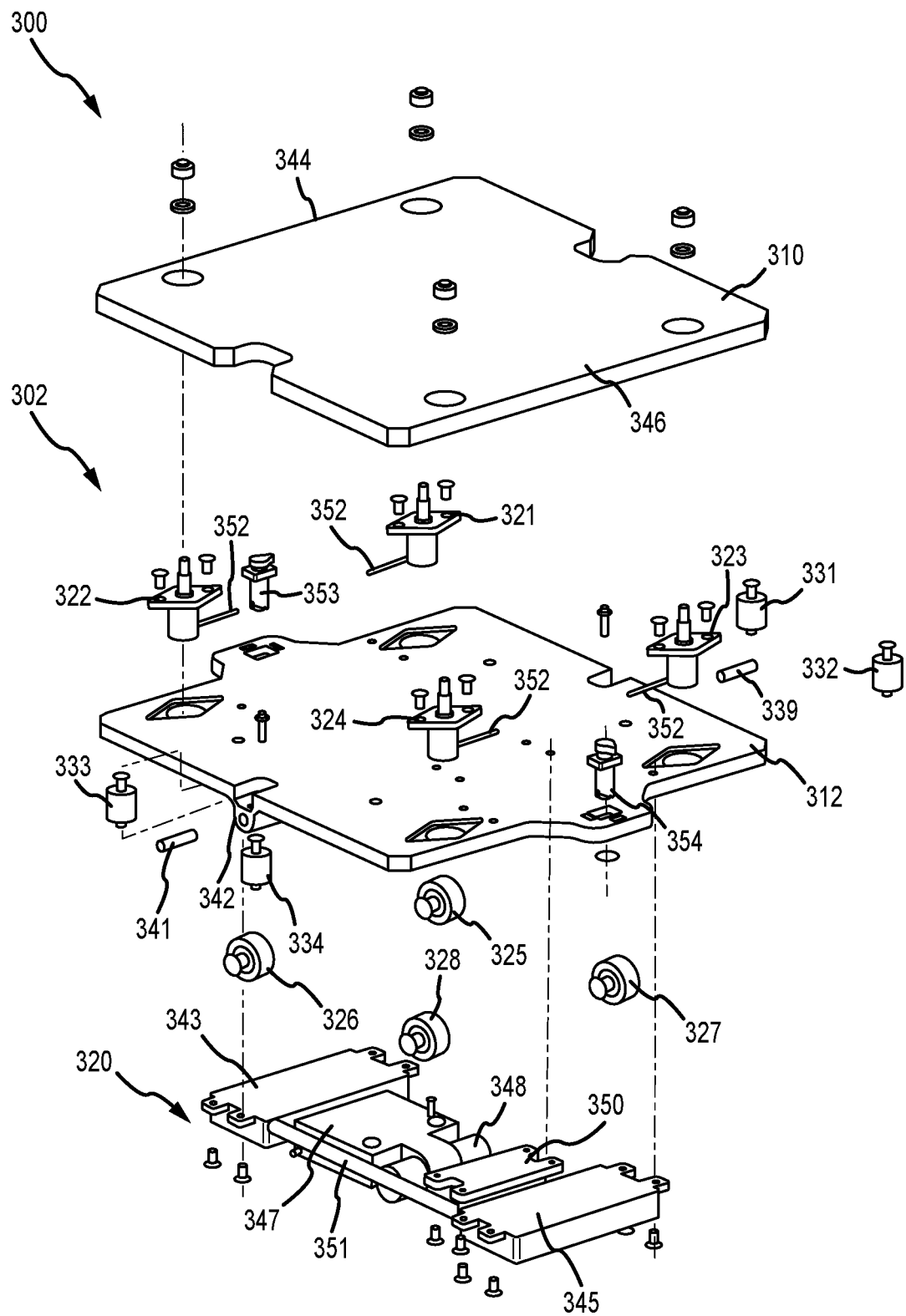

Referring more particularly to the exploded view illustrated in FIG. 3B, and with continued reference to FIGS. 3A, 3C, 3D and 3E, the drive car 302 includes a plurality of strain gauge sensors, including, in various embodiments, a first strain gauge sensor 321, a second strain gauge sensor 322, a third strain gauge sensor 323 and a fourth strain gauge 324. As will be described in further detail below, with reference to FIGS. 4A, 4B, 4C and 4D, each of the plurality of strain gauge sensors is configured to detect pivotal movement of the first plate 310 with respect to the second plate 312 and to convert the pivotal movement into electric signals that are provided to the drive assembly 320, which then propels the drive car 302 in either the fore direction or the aft direction along the drive track 304 based on the polarity of the electric signals and at a velocity based on the magnitude of the electric signals.

Figure 3C:
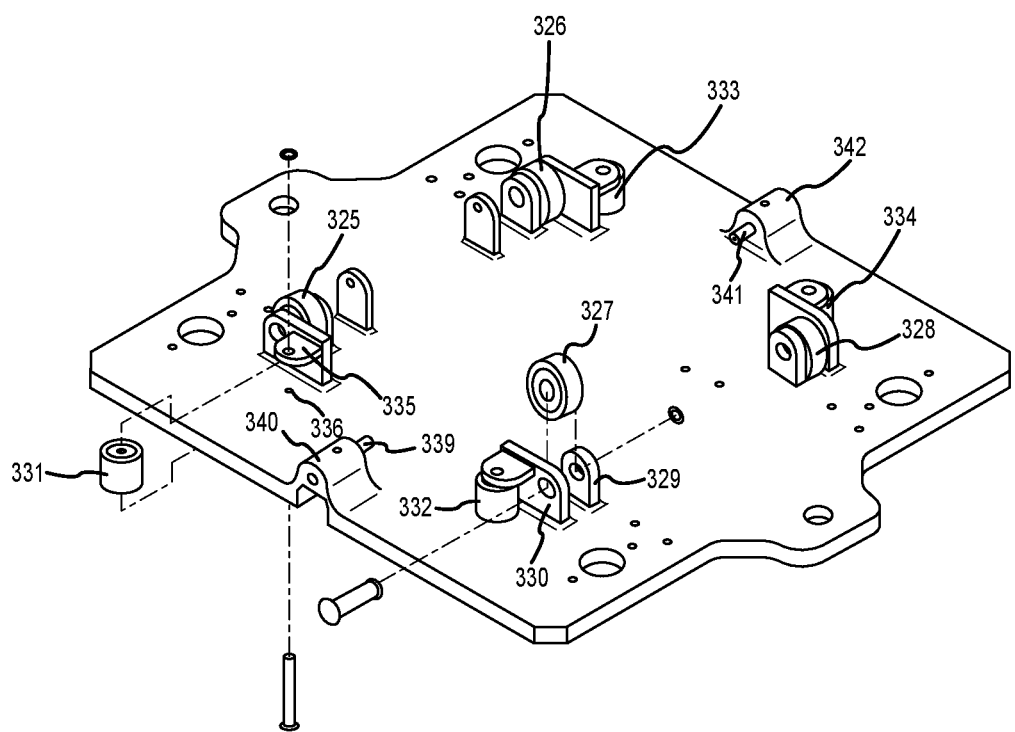
Figure 3D:
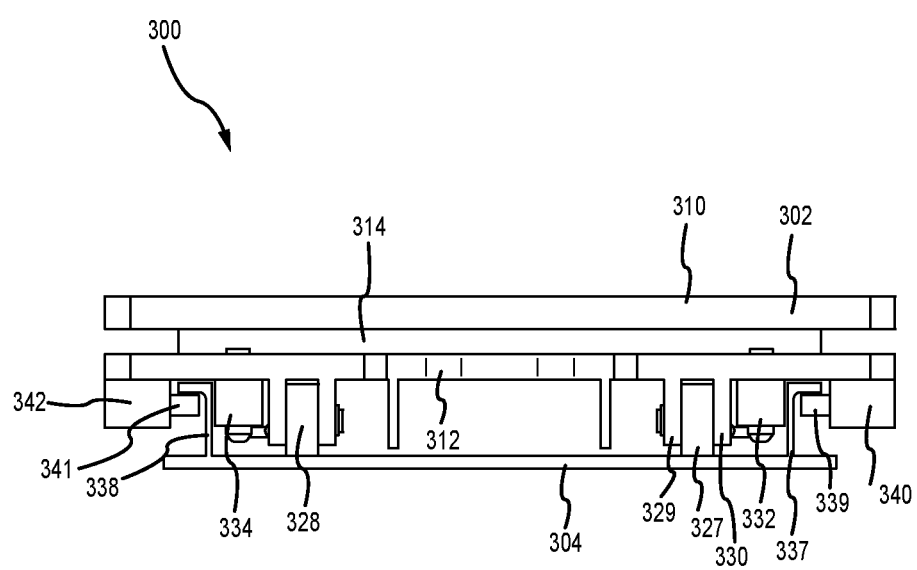
Figure 3E:
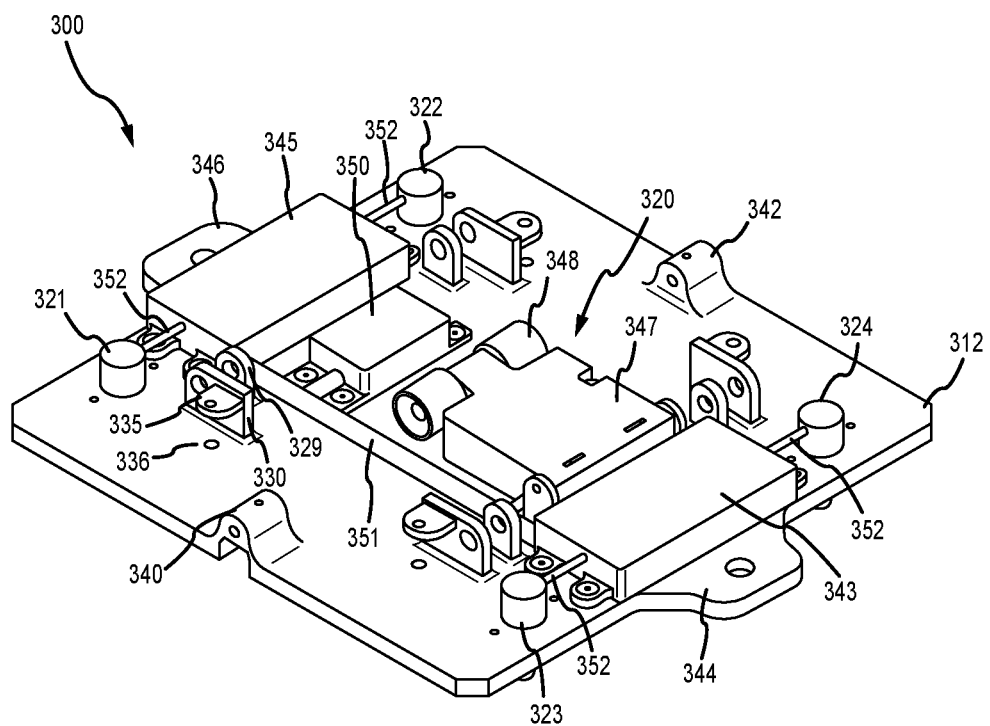

Referring to the same drawings, the drive car 302 further includes a plurality of horizontal guide roller assemblies, including, in various embodiments, a first horizontal guide roller assembly 325, a second horizontal guide roller assembly 326, a third horizontal guide roller assembly 327, and a fourth horizontal guide roller assembly 328. As illustrated in FIGS. 3C and 3D, each of the plurality of horizontal guide roller assemblies is rotatably secured to a pair of flanges, including a first flange 329 and a second flange 330 that extend in a downward direction from an underside of the second plate 312. The plurality of horizontal guide roller assemblies is configured to enable the drive car 302 to provide rolling contact between the second plate 312 and the drive track 304, thereby enabling the drive car 302 to roll horizontally on the drive track 304.

Similarly, the drive car 302 further includes a plurality of vertical guide roller assemblies, including, in various embodiments, a first vertical guide roller assembly 331, a second vertical guide roller assembly 332, a third vertical guide roller assembly 333, and a fourth vertical guide roller assembly 334. As illustrated in FIGS. 3C and 3D, each of the plurality of vertical guide roller assemblies is rotatably secured to a pair of flanges, including a third flange 335 that extends laterally outward from the second flange 330 and a fourth flange 336 that is formed by the underside of the second plate 312. The plurality of vertical guide roller assemblies is configured to enable the drive car 302 to provide rolling contact against a pair of vertical flanges extending upward from the track, including, for example, a first vertical flange 337 configured to contact the first vertical guide roller assembly 331 and the second vertical guide roller assembly 332, and a second vertical flange 338 configured to contact the third vertical guide roller assembly 333 and the fourth vertical guide roller assembly 334. In various embodiments, interaction between the plurality of vertical guide roller assemblies and the pair of vertical flanges constrains the drive car 302 to remain on the drive track 304 as it is propelled in a fore direction or an aft direction along the length of the drive track 304. In various embodiments, a first locking pin 339 is configured to extend from a first housing 340 attached to the underside of the second plate 312 and engage a lip extending from the first vertical flange 337 and a second locking pin 341 is configured to extend from a second housing 342 attached to the underside of the second plate 312 and engage a lip extending from the second vertical flange 338. Engagement of the first locking pin 339 with the lip extending from the first vertical flange 337 and the second locking pin 341 with the lip extending from the second vertical flange 338 prevents unauthorized removal of the drive car 302 from the drive track 304.

Referring still to the exploded view illustrated in FIG. 3B, and with continued reference to FIGS. 3A, 3C, 3D and 3E, the drive assembly 320 includes, in various embodiments, a first battery 343 located at a fore end 344 (or a first end) of the drive car 302 and a second battery 345 located at an aft end 346 (or a second end) of the drive car 302. The drive assembly 320 further includes a drive unit 347 configured to receive electrical power from the first battery 343 and the second battery 345 and to rotate a drive wheel 348 (or a plurality of drive wheels) in contact with the drive track 304 in order to propel the drive car 302 along the drive track 304. The drive assembly 320 further includes a control unit 350 configured to control operation of the drive unit 347 based on signals received from the plurality of strain gauge sensors. In various embodiments, an electrical harness 351 electrically connects each of the first battery 343, the second battery 345, the drive unit 347 and the control unit 350. In various embodiments, the electrical harness 351 enables power sharing between the first battery 343 and the second battery 345, as well as a flow of electrical power from one or both of the batteries to the drive unit 347. The electrical harness 351 is also connected to a signal harness 352 that couples each of the plurality of strain gauge sensors to the control unit 350, thereby enabling the control unit 350 to receive signals representing the pivotal orientation of the first plate 310 with respect to the second plate 312 and to control the drive unit 347 based on the signals. As will be described further below, the drive car 302 also includes a fore docking plunger assembly 353 and an aft docking plunger assembly 354, either or both of which are used when charging the batteries.

Referring now to FIGS. 4A, 4B, 4C and 4D, various operational aspects of a cargo aisle drive system 400, are illustrated, in accordance with various embodiments. The cargo aisle drive system 400 is similar to the cargo aisle drive system 300 described above with reference to FIGS. 3A-3E. As described above, the cargo aisle drive system 400 includes a drive car 402 disposed on a drive track (see, e.g., the drive track 304 described above with reference to FIG. 3D). In various embodiments, the drive car 402 includes a first plate 410 (or an upper plate) and a second plate 412 (or a lower plate), where the first plate 410 is pivotally mounted onto the second plate 412 via a ridge 414 that extends along an underside of the first plate 410. A drive assembly 420 is configured for attachment to an underside of the second plate 412 and configured to propel the drive car 402 along the drive track. The drive assembly 420 further includes a drive unit 447 configured to receive electrical power from a first battery 443 and a second battery 445 and to rotate a drive wheel 448 (or a plurality of drive wheels) in contact with the drive track in order to propel the drive car 402 along the drive track.

Figure 4A:
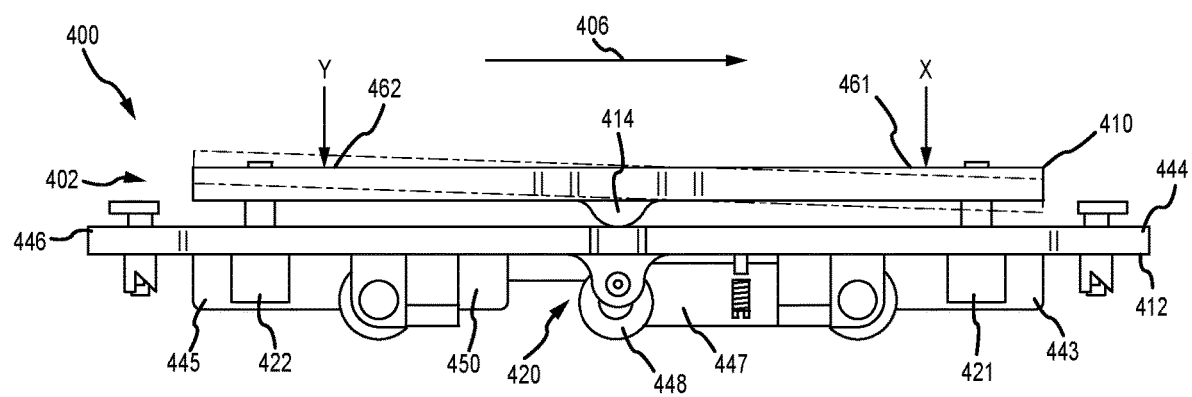
FIGS. 4A, 4B, 4C and 4D illustrate various operational aspects of a cargo aisle drive system, in accordance with various embodiments.
Figure 4B:
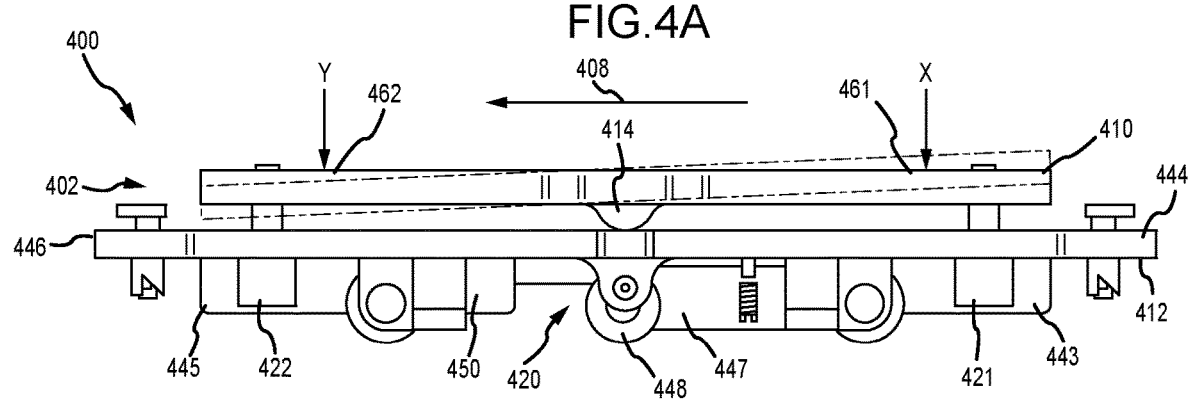

The drive car 402 includes a plurality of strain gauge sensors, including, in various embodiments, a first strain gauge sensor 421 and a second strain gauge sensor 422, both of which are similar in construction and operation of the plurality of strain gauge sensors referred to above with reference to FIGS. 3A-3E. Each of the plurality of strain gauge sensors is configured to detect pivotal movement of the first plate 410 with respect to the second plate 412 and to convert the pivotal movement into electric signals that are provided to the drive assembly 420, which then propels the drive car 402 in either the fore direction or the aft direction along the drive track based on the polarity of the electric signals and at a velocity based on the magnitude of the electric signals. Referring to FIGS. 4A and 4B, for example, the first plate 410 is configured to receive a first load (X) at a first location 461 proximate a fore end 444 of the drive car 402 and a second load (Y) at a second location 462 proximate an aft end 446 of the drive car 402. The first load (X) and the second load (Y) are typically applied to the first plate 410 via the feet of an operator standing on the first plate 410 of the drive car 402. When the first load (X) is greater than the second load (Y), as depicted in FIG. 4A, the first plate 410 pivots downward at the fore end 444, thereby causing the first strain gauge sensor 421 to generate an output signal that is relatively greater than an output signal generated by the second strain gauge sensor 422. A control unit 450 receives the output signals generated by both the first strain gauge sensor 421 and the second strain gauge sensor 422 and instructs the drive unit 447 to propel the drive car 402 in a fore direction 406. Similarly, when the second load (Y) is greater than the first load (X), as depicted in FIG. 4B, the first plate 410 pivots downward at the aft end 446, thereby causing the second strain gauge sensor 422 to generate an output signal that is relatively greater than an output signal generated by the first strain gauge sensor 421. The control unit 450 receives the output signals generated by both the first strain gauge sensor 421 and the second strain gauge sensor 422 and instructs the drive unit 447 to propel the drive car 402 in an aft direction 408.

Figures 4C, 4D:
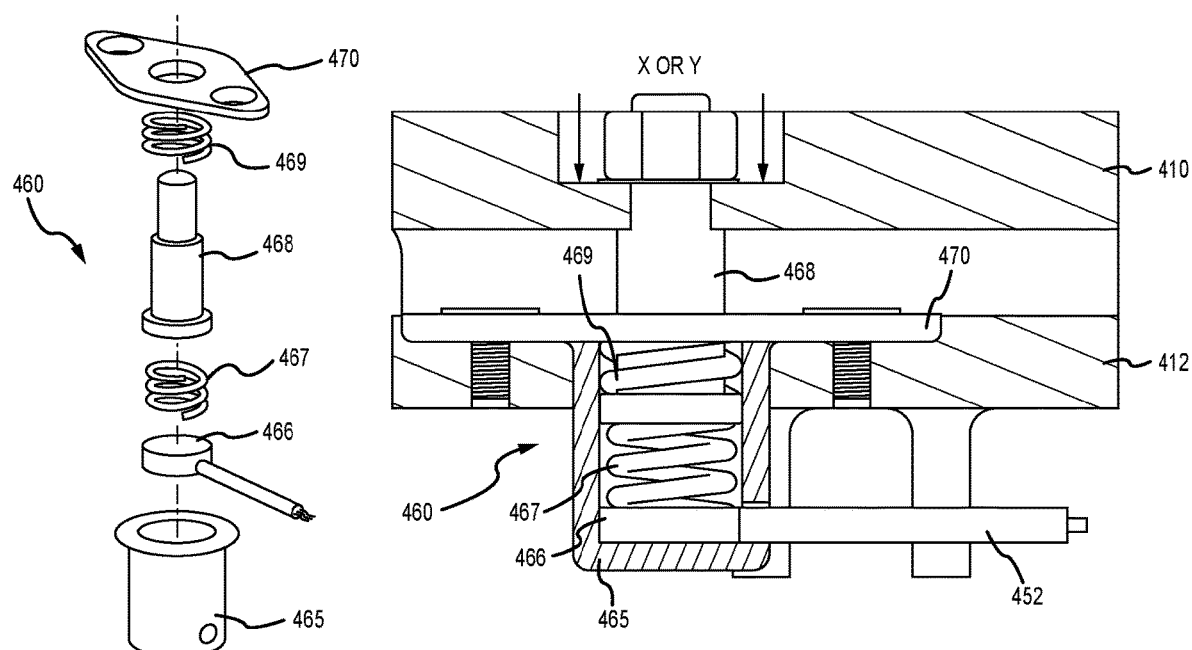

Referring now to FIGS. 4C and 4D, with continued reference to FIGS. 4A and 4B, a strain gauge sensor 464, similar in construction to and operation of both the first strain gauge sensor 421 and the second strain gauge sensor 422, is illustrated. In various embodiments, the strain gauge sensor 464 includes a housing 465, a strain gauge 466 (e.g., a piezoelectric sensor), a first bias member 467 (e.g., a lower compression spring), an actuator rod 468, an second bias member 469 (e.g., an upper compression spring) and a cover plate 470 configured for mounting the strain gauge sensor 460 to the second plate 412 of the drive car 402. A signal harness 452 couples the strain gauge sensor 460 (or the strain gauge 466) to the control unit 450, thereby enabling the control unit 450 to receive signals representing the pivotal orientation of the first plate 410 with respect to the second plate 412 and to control the drive unit 447 based on the signals. As illustrated, when a compressive load (X or Y) is placed on the actuator rod 468, the first bias member 467 is urged against the strain gauge 466, thereby causing an increased signal to be output to the control unit 450 via the signal harness 452. Conversely, when a tensile load (X or Y) is placed on the actuator rod 468, the first bias member 467 is urged away the strain gauge 466, thereby causing a reduced signal (or no signal at all) to be output to the control unit 450 via the signal harness 452. During operation, the control unit 450 receives output signals from both the first strain gauge sensor 421 and the second strain gauge sensor 422 and, based on the characteristics of the output signals (e.g., the relative polarity or magnitude), instructs the drive unit 447 to propel the drive car 402 in either the fore direction 406 or the aft direction 408.

Figure 5A:
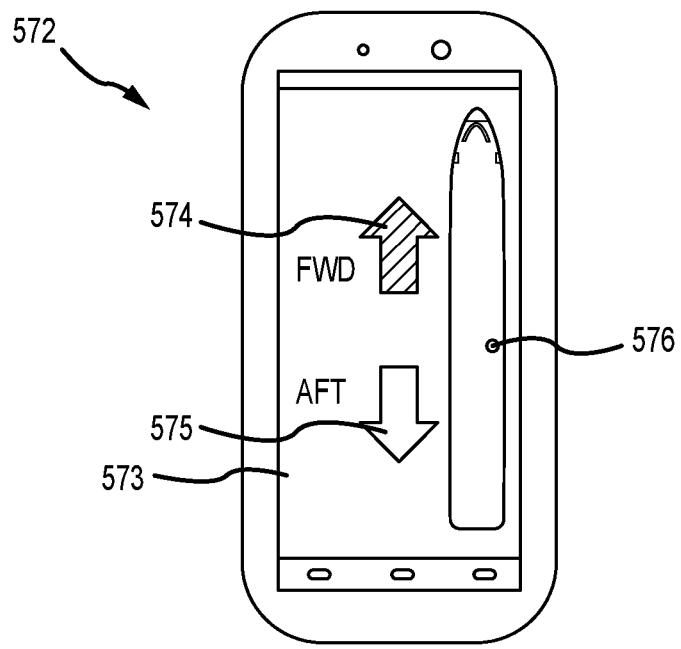
FIGS. 5A and 5B illustrate a control panel configured for use in conjunction with a cargo aisle drive system, in accordance with various embodiments.
Figure 5B:
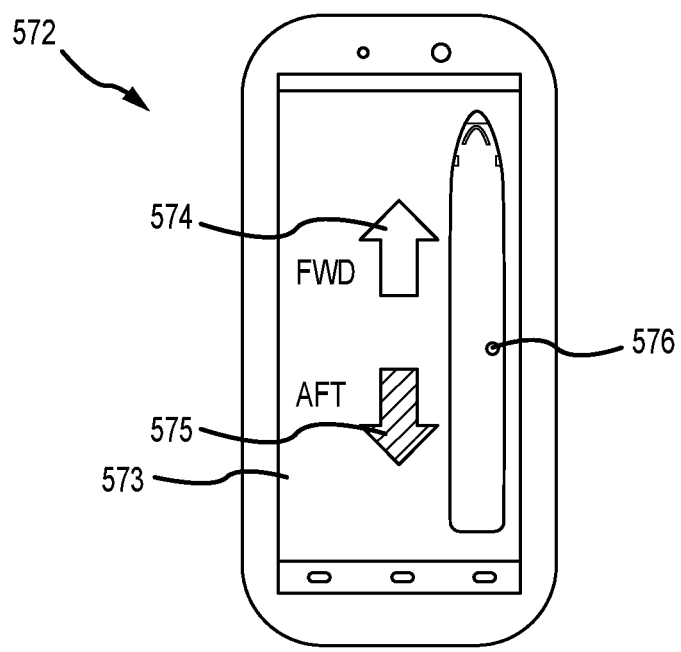

Referring now to FIGS. 5A and 5B, a control panel 572 configured for use in conjunction with a cargo aisle drive system, such as, for example, the cargo aisle drive system 300 or the cargo aisle drive system 400 described above, is illustrated, in accordance with various embodiments. The control panel 572 is typically configured for hand-held use by an operator and, in various embodiments, may be used to override control of the cargo aisle drive system based on pivoting a first plate (e.g., the first plate 410) with respect to a second plate (e.g., the second plate 412). In various embodiments, the control panel 572 provides a graphical user interface 573 that includes a fore direction button 574 and an aft direction button 575, either of which may be activated (e.g., by an operator's finger) to propel a drive car, respectively, in a fore direction (see FIG. 5A) or an aft direction (see FIG. 5B). In various embodiments, a position locator 576 may also be illustrated on the graphical user interface 573 to inform the operator of the position of the drive car with respect to a cargo cabin within an aircraft. Rather than completely override control of the cargo aisle drive system based on pivoting the first plate with respect to a second plate, the pivot function may be used as a brake in conjunction with the control panel 572. For example, and with reference to FIGS. 4A and 4B, if the control panel directs the drive car 402 to move in the fore direction 406, then application of the second load (Y) greater than the first load (X) may instruct the control unit 450 to brake the drive car 402. Similarly, if the control panel directs the drive car 402 to move in the aft direction 408, then application of the first load (X) greater than the second load (Y) may instruct the control unit 450 to brake the drive car 402. In various embodiments, the control panel 572 is operably connected to a control unit (e.g., the control unit 450) via a cable extending between the two or a wireless link.

Referring now to FIGS. 6A, 6B, 6C, 6D and 6E, a battery charging system 680 configured for use in conjunction with a cargo aisle drive system 600, such as, for example, the cargo aisle drive system 300 or the cargo aisle drive system 400 described above, is illustrated, in accordance with various embodiments. Similar to the description above, the cargo aisle drive system 600 includes a drive car 602 disposed on a drive track 604. In various embodiments, a first battery charging system 681 (e.g., a first inductive charger) is positioned at a fore end 644 of the drive track 604 and a second battery charging system 682 (e.g., a second inductive charger) is positioned at an aft end 646 of the drive track 604. In various embodiments, where the first battery charging system 681 and the second battery charging system 682 comprise inductive chargers, the battery systems may be charged wirelessly when docked at the fore end 644 or the aft end 646 of the drive track 604. For example, when the drive car 602 is docked at the fore end 644 of the drive track 604, a first battery 643 is charged wirelessly by the first battery charging system 681, while a second battery (e.g., the second battery 345 in FIG. 3B) is charged via an electrical connection with the first battery 643, the electrical connection being established, for example, via an electrical harness (e.g., the electrical harness 351 illustrated in FIG. 3B) extending between the two batteries.

Figure 6A:
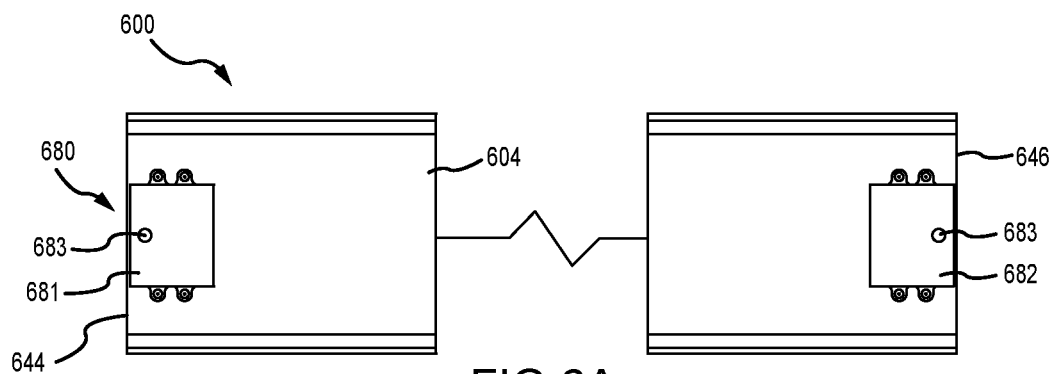
FIGS. 6A, 6B, 6C, 6D and 6E illustrate a battery charging system configured for use in conjunction with a cargo aisle drive system, in accordance with various embodiments.
Figure 6B:
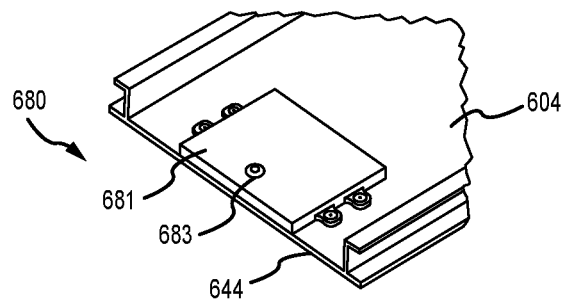
Figure 6C:
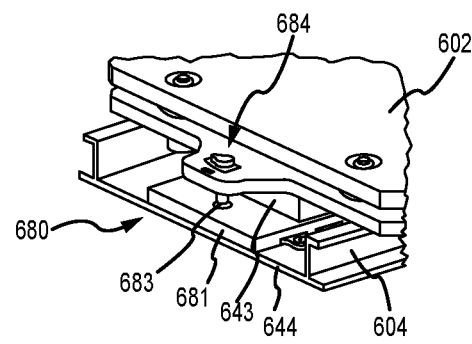
Figure 6D:
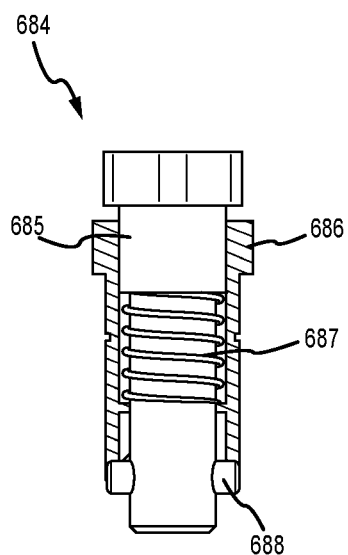
Figure 6E:
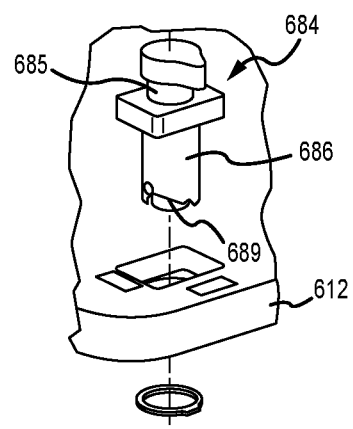

Referring now to FIGS. 6D and 6E, with continued reference to FIGS. 6A, 6B and 6C, either or both the first battery charging system 681 and the second battery charging system 682 include a docking port 683 configured to receive a docking plunger assembly 684 (e.g., either of the fore docking plunger assembly 353 or the aft docking plunger assembly 354 described above with reference to FIG. 3B). In various embodiments, the docking plunger assembly 684 includes a plunger 685 configured for sliding engagement with a plunger shell 686, which is configured for attachment to a second plate 612 of the drive car 602. A bias member 687 (e.g., a coil spring) biases a pin 688 upwardly against a lower section of the plunger shell 686. A guide profile 689 at the lower section of the plunger shell 686 enables positioning of the plunger 685 within the plunger shell 686 at different axial locations, such that the plunger 685 engages or disengages the docking port 683, depending on the position of a plunger head 690 configured for quarter-turn rotation of the plunger 685 within the plunger shell 686.

Figure 7A:
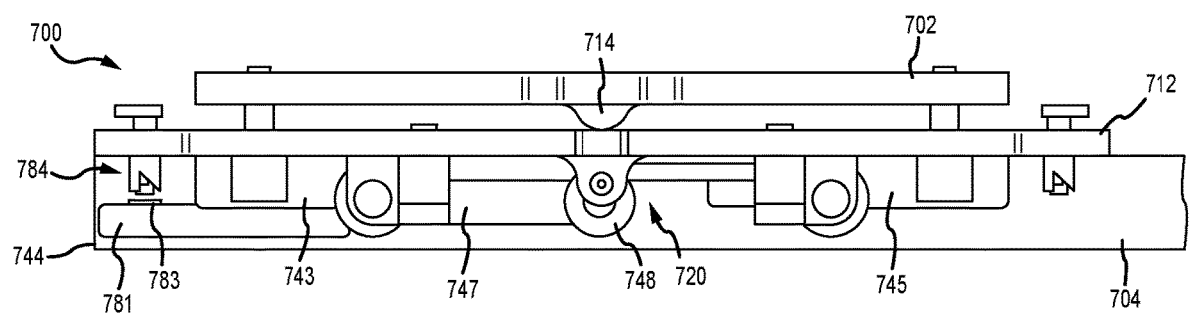
FIGS. 7A, 7B and 7C illustrate a docking system configured for use in conjunction with a cargo aisle drive system, in accordance with various embodiments.
Figure 7B:
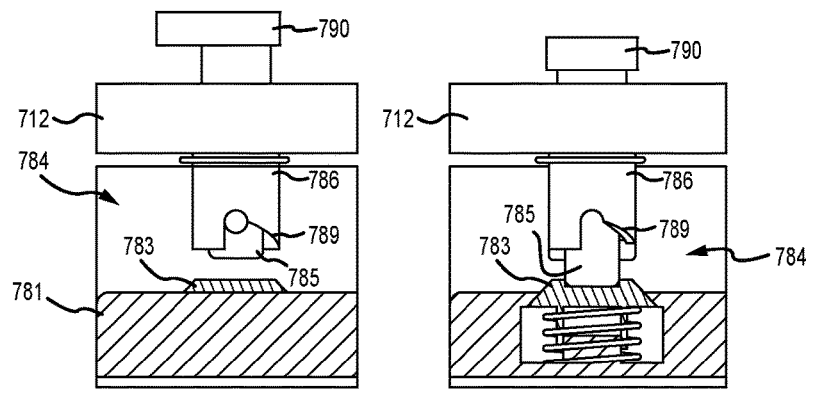
Figure 7C:
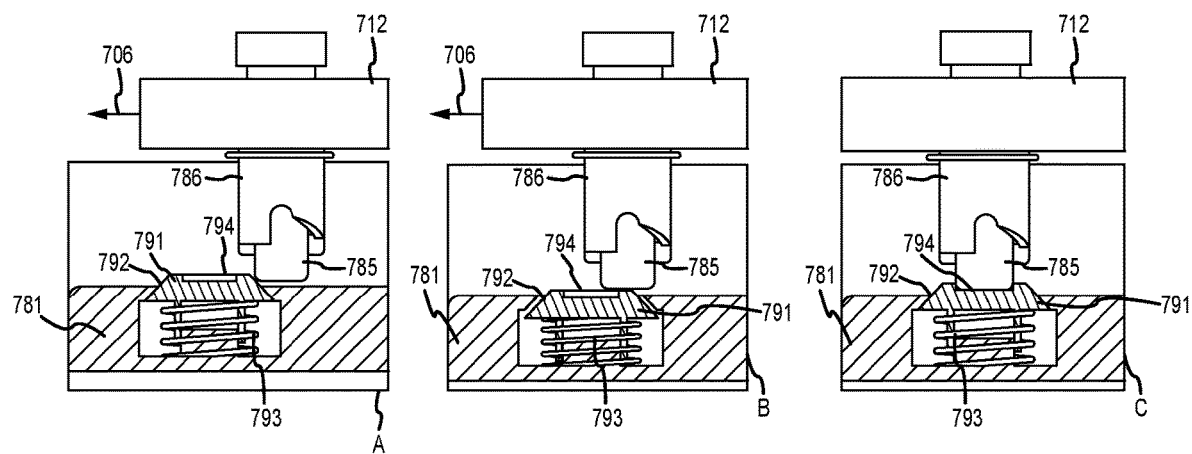

Referring now to FIGS. 7A, 7B and 7C, operation of a docking system configured for use in conjunction with a cargo aisle drive system 700, such as, for example, the cargo aisle drive system 300 or the cargo aisle drive system 400 described above, is illustrated, in accordance with various embodiments. As described above, the cargo aisle drive system 700 includes a drive car 702 disposed on a drive track 704. In various embodiments, the drive car 702 includes a first plate 710 (or an upper plate) and a second plate 712 (or a lower plate), where the first plate 710 is pivotally mounted onto the second plate 712 via a ridge 714 that extends along an underside of the first plate 710. A drive assembly 720 is configured for attachment to an underside of the second plate 712 and configured to propel the drive car 702 along the drive track 704. The drive assembly 720 further includes a drive unit 747 configured to receive electrical power from a first battery 743 and a second battery 745 and to rotate a drive wheel 748 (or a plurality of drive wheels) in contact with the drive track 704 in order to propel the drive car 702 along the drive track 704.

In various embodiments, a first battery charging system 781 is positioned at a fore end 744 of the drive track 704 and a second battery charging system (not illustrated in FIG. 7A) is positioned at an aft end of the drive track 704. While the description that follows refers to docking the drive car 702 at the first battery charging system 781, the description is equally applicable to the second battery charging system located at the aft end of the drive track 704. Similar to the description above with reference to FIGS. 6A-6E, the first battery charging system 781 includes a docking port 783 configured to receive a docking plunger assembly 784. In various embodiments, the docking plunger assembly 784 includes a plunger 785 configured for sliding engagement with a plunger shell 786, which is configured for attachment to the second plate 712 of the drive car 702. A guide profile 789 at the lower section of the plunger shell 786 and a pin 788 extending through the plunger 785 enables positioning of the plunger 785 within the plunger shell 786 at different axial locations, such that the plunger 785 engages or disengages the docking port 783, depending on the position of a plunger head 790 configured for quarter-turn rotation of the plunger 785 within the plunger shell 786.

As illustrated in FIG. 7C, the docking port 783, configured to receive the docking plunger assembly 784, may include, in various embodiments, a receiver 791 having a tapered surface 792. The receiver 791 is mounted within the first battery charging system 781 and biased via a coil spring 793 in a direction toward the docking plunger assembly 784. As the drive car 702 is propelled in a fore direction 706, the plunger 785, when oriented at its lowest position with respect to the plunger shell 786, contacts the tapered surface 792 of the receiver 791 and urges the receiver 791 downward against the coil spring 793, as illustrated at positions A and B. Once the plunger 785 is centered above an opening 794 cut into a top portion of the receiver 791, the coil spring urges the receiver 791 upward to engage the plunger 785, as illustrated at position C, thereby locking the docking plunger assembly 784 against the docking port 783 and preventing movement of the drive car 702 with respect to the drive track 704 during a battery charging operation. Once the battery charging operation is complete, the plunger 785 may be rotated, as illustrated in FIG. 7B, such that the plunger 785 is positioned at its highest axial position with respect to the plunger shell 786, thereby allowing the drive car 702 to translate with respect to the drive track 704.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A cargo aisle drive system, comprising:
a drive track; and a drive car configured for motorized translation along a length of the drive track, the drive car including
a first plate,
a second plate having an upper surface and a lower surface, the first plate pivotally disposed on the upper surface of the second plate,
a drive assembly connected to the lower surface of the second plate, and
a first strain gauge sensor configured to detect a pivotal movement between the first plate and the second plate of the drive car, wherein the first strain gauge sensor is electrically coupled to the drive assembly and the drive assembly is configured to propel the drive car in a first direction or a second direction based on a signal received from the first strain gauge sensor representing the pivotal movement between the first plate and the second plate of the drive car.

2. The cargo aisle drive system of claim 1, wherein the first strain gauge sensor is disposed proximate a first end of the drive car, and wherein the first strain gauge sensor includes an actuator rod slidably disposed with respect to the second plate.

3. The cargo aisle drive system of claim 1, further comprising a second strain gauge sensor, the first strain gauge sensor disposed proximate a first end of the drive car and the second strain gauge sensor disposed proximate a second end of the drive car.

4. The cargo aisle drive system of claim 3, wherein at least one of the first strain gauge sensor and the second strain gauge sensor includes an actuator rod configured to transfer a tensile load or a compressive load to a strain gauge.

5. The cargo aisle drive system of claim 4, wherein the strain gauge is electrically coupled to the drive assembly and the drive assembly is configured to propel the drive car in a first direction or a second direction based on a signal received from the strain gauge representing the pivotal movement between the first plate and the second plate of the drive car.

6. The cargo aisle drive system of claim 1, wherein the drive assembly includes a drive wheel in contact with the drive track and configured to propel the drive car along the length of the drive track in a first direction and a second direction.

7. The cargo aisle drive system of claim 6, wherein a horizontal guide roller assembly is connected to the lower surface of the second plate and configured to roll over the drive track.

8. The cargo aisle drive system of claim 7, wherein a first vertical guide roller assembly is connected to the lower surface of the second plate and configured to roll against a first vertical flange connected to the drive track.

9. The cargo aisle drive system of claim 8, wherein a second vertical guide roller assembly is connected to the lower surface of the second plate and configured to roll against a second vertical flange connected to the drive track.

10. The cargo aisle drive system of claim 1, wherein the drive car includes a first battery configured for charging via a first battery charging system disposed at a first end of the drive track.

11. The cargo aisle drive system of claim 10, wherein the drive car includes a second battery configured for charging via a second battery charging system disposed at a second end of the drive track.

12. The cargo aisle drive system of claim 10, wherein the drive car includes a docking plunger assembly configured for releasable connection to the first battery charging system.

13. A drive car configured to propel an operator along a drive track of a cargo aisle drive system, comprising:
a first plate;
a second plate having an upper surface and a lower surface, the first plate pivotally disposed on the upper surface of the second plate;
a drive assembly connected to the lower surface of the second plate, and
a first strain gauge sensor configured to detect a pivotal movement between the first plate and the second plate of the drive car, wherein the first strain gauge sensor includes an actuator rod slidably disposed with respect to the second plate, wherein the first strain gauge sensor is electrically coupled to the drive assembly and the drive assembly is configured to propel the drive car in a first direction or a second direction based on a signal received from the first strain gauge sensor representing the pivotal movement between the first plate and the second plate of the drive car.

14. The drive car of claim 13, further comprising a second strain gauge sensor, the first strain gauge sensor disposed proximate a first end of the drive car and the second strain gauge sensor disposed proximate a second end of the drive car.

15. The drive car of claim 14, wherein the drive assembly includes a drive wheel configured for contact with the drive track and to propel the drive car along a length of the drive track in a first direction and a second direction.

16. The drive car of claim 15, wherein a horizontal guide roller assembly is connected to the lower surface of the second plate and configured to roll over the drive track.

17. The drive car of claim 16, wherein a first vertical guide roller assembly is connected to the lower surface of the second plate and configured to roll against a first vertical flange connected to the drive track and a second vertical guide roller assembly is connected to the lower surface of the second plate and configured to roll against a second vertical flange connected to the drive track.

18. The drive car of claim 13, further comprising a first battery configured for charging via a first battery charging system disposed at a first end of the drive track.

19. The drive car of claim 18, further comprising a second battery configured for charging via a second battery charging system disposed at a second end of the drive track.

* * * * *